United States Patent
Simonson et al.

(10) Patent No.: US 6,877,189 B2
(45) Date of Patent: Apr. 12, 2005

(54) ROLLER CAM BUCKLE

(76) Inventors: Eric Simonson, 4780 Hugo Ave., Salt Lake City, UT (US) 84117; Roger Simonson, 2825 Floribunda Dr., Salt Lake City, UT (US) 84117

(*) Notice: Subject to any disclaimer, the term of this patent is extended or adjusted under 35 U.S.C. 154(b) by 0 days.

(21) Appl. No.: 10/371,007

(22) Filed: Feb. 21, 2003

(65) Prior Publication Data

US 2004/0163216 A1 Aug. 26, 2004

(51) Int. Cl.$^7$ ............................................. A44B 11/06
(52) U.S. Cl. ....................................... 24/170; 24/163 R
(58) Field of Search ............................. 24/163 R, 170, 24/168, 191, 193, 115 L

(56) References Cited

U.S. PATENT DOCUMENTS

| | | | |
|---|---|---|---|
| 1,708 A | 6/1840 | Fogg | |
| 3,440 A | 2/1844 | Hatch | |
| 12,086 A | 2/1854 | Sourek | |
| 48,610 A | 7/1865 | White | |
| 52,154 A | 1/1866 | Frye | |
| 64,693 A | 5/1867 | Ogier | |
| 74,867 A | 2/1868 | Hurd | |
| 163,195 A | 5/1875 | Hester | |
| 223,556 A | 1/1880 | Thayer | |
| 292,934 A | * 2/1884 | Menzel | ..................... 24/163 R |
| 342,110 A | 5/1886 | Kjellstrom | |
| 350,226 A | * 10/1886 | Youmans | ........................ 54/28 |
| 379,078 A | * 3/1888 | Parker | ......................... 24/191 |
| 416,985 A | 12/1889 | Beattie | |
| 906,391 A | 12/1908 | Dickson et al. | |
| 913,469 A | 2/1909 | Cleaveland | |
| 950,434 A | 2/1910 | Carlson | |
| 1,257,028 A | 2/1918 | Ryther | |
| 2,622,293 A | 12/1952 | Wermlinger | |
| 2,653,365 A | 9/1953 | Elsner | |

(Continued)

FOREIGN PATENT DOCUMENTS

| | | | | |
|---|---|---|---|---|
| DE | 3043432 A | * | 6/1982 | ........... A44B/11/14 |
| DE | 29701473 U1 | * | 3/1997 | ........... A44B/11/24 |
| FR | 2378469 A | * | 9/1978 | ........... A44B/11/06 |
| FR | 2484216 A | * | 12/1981 | ........... A44B/11/08 |

*Primary Examiner*—James R. Brittain
(74) *Attorney, Agent, or Firm*—Thorpe North & Western, LLP

(57) ABSTRACT

A method and apparatus for reducing friction in a cam buckle for tightening a strap. The cam buckle includes a frame, a brake member, a roller member, a biasing element and a webbed strap. The brake member includes a serrated surface and is rotatably coupled to the frame and pivotal about a first axis. The roller member is rotatably coupled to the frame about a second axis, wherein the first axis and the second axis are substantially parallel to each other. The biasing element is operable to bias the serrated surface of the brake member toward the roller member. The webbed strap is formed from a polymeric material and is operable to be biased between the serrated surface and the roller member so that the brake member biases the webbed strap against the roller member. With this arrangement, when the webbed strap is placed in tension, such tension is maintained by preventing movement of the webbed strap in one direction and allowing movement in a second direction to increase the tension. The roller member is operable to rotate with movement of the webbed strap in the second direction to increase the tension in the webbed strap.

23 Claims, 6 Drawing Sheets

U.S. PATENT DOCUMENTS

| | | | |
|---|---|---|---|
| D188,897 S | | 9/1960 | Prete, Jr. |
| 3,091,830 A | | 6/1963 | Harley |
| 3,134,153 A | * | 5/1964 | Harley ........................ 24/191 |
| 3,253,309 A | | 5/1966 | Baresch |
| 3,413,691 A | | 12/1968 | Elsner |
| 3,678,542 A | | 7/1972 | Prete, Jr. |
| 3,686,715 A | | 8/1972 | Brodnicki |
| 3,872,550 A | | 3/1975 | Yang |
| 4,097,023 A | | 6/1978 | Muller |
| 4,125,115 A | * | 11/1978 | Mayo et al. ................ 606/203 |
| 4,130,949 A | * | 12/1978 | Seidel ........................ 36/50.1 |
| 4,136,422 A | | 1/1979 | Ivanov et al. |
| 4,398,680 A | | 8/1983 | Ogawa et al. |
| D274,861 S | | 7/1984 | Lindblad |
| 4,464,811 A | | 8/1984 | Holmes |
| D283,369 S | | 4/1986 | Martin |
| 4,717,088 A | | 1/1988 | Fohl |
| 4,727,628 A | | 3/1988 | Rudholm |
| 4,843,688 A | | 7/1989 | Ikeda |
| D303,232 S | | 9/1989 | Lortz et al. |
| 5,172,455 A | * | 12/1992 | Johnson et al. ............... 24/170 |
| 5,291,638 A | | 3/1994 | Huang |
| D362,415 S | | 9/1995 | Takimoto |
| D377,155 S | | 1/1997 | Takimoto |
| 5,673,936 A | * | 10/1997 | Mondel ...................... 297/483 |
| 5,809,620 A | * | 9/1998 | Crowley et al. .............. 24/302 |
| 5,904,198 A | | 5/1999 | Huang |
| 6,081,973 A | | 7/2000 | Liu |
| 6,148,485 A | | 11/2000 | Wu |

* cited by examiner

ROLLER CAM BUCKLE

FIELD OF THE INVENTION

The present invention relates generally to strap securing devices and, more particularly, the present invention relates to a roller cam buckle that reduces exertion force for cinching and securing objects in place with a strap.

RELATED ART

The use of straps to secure objects and cargo is well known in the art. Mechanical advantages to increase the tension force securing the object, for a given pulling force exerted by the operator have been provided over the years. Buckles have been designed and manufactured that allow for a cinch to apply tension force on the strap. The tension force applied to the strap through the buckle secures the cargo. A self locking mechanism allows the operator to apply a pulling force on the strap and "lock in" the tension force on the other side of the buckle when the pulling force is removed. In general for a single self locking cam buckle, the pulling force will always be greater than the tension force due to high friction losses in the buckle when tightening the load. In fact, the tension force can be two to three times less than the pulling force for most static cam buckles.

FIG. 1 illustrates one type of conventional cam buckle referred to as a static cam buckle 10. Such a static cam buckle 10 includes a spring loaded cam 30 coupled to a frame 12. The frame includes two side rails 14 with a front rail 16 having a grooved surface 22, a shaft 18 and a back rail 20 each extending between the two side rails 14. The spring loaded cam 30 includes a cam portion 32 having a serrated surface 36, an arm 34 and a spring element (not shown). The cam portion 32 is rotatably mounted about the shaft 18 so that the spring element biases the cam portion 32, and particularly, biases the serrated surface 36 of the cam portion 32 against the grooved surface 22 of the front rail 16. With this arrangement, a strap 40 is positioned between the cam portion 32 and the front rail 16, which provides a locking mechanism for a user to secure an object.

For example, as a user pulls in a direction of a pulling force Fp, the cam portion 32 rotates upward against the biasing force of the spring element to allow the strap 40 to be pulled through the locking mechanism to thereby, place a tension force Ft on the strap 40. When the user releases the pulling force Fp, the cam portion 32, via the biasing element, immediately clamps against the strap 40 and front rail 16, which restricts the tension force Ft from drawing toward the direction of the tension force Ft, thereby, substantially maintaining such tension force Ft. In this manner, the strap 40 can be pulled in the direction of the pulling force Fp, but is restricted from moving in the direction of the tension force Ft, thereby allowing a user to maintain a tension force Ft to secure a given object. Such tension force Ft can be released by simply placing a downward force Fd on the arm 34 of the spring loaded cam 30, which pivots the cam portion 32 away from the strap 40 and front rail 16, thereby, releasing the strap 40 and the tension force Ft therein.

One problem with the static cam buckle 10 is that the user cannot apply enough pulling force Fp to obtain the required tension force Ft that may be needed to secure a given load. This is especially critical for cases where a high tension force Ft is required, such as for objects strapped to vehicles where the vibration of the road can cause settling in the load, thereby, loosening the strap or otherwise reducing the tension force Ft. This disparity between the pulling force Fp and the necessary tension force Ft is due to frictional losses of the strap 40 between the cam portion 32 and the front rail 16. As previously indicated, such frictional losses in the static cam buckle 10 can result in the tension force Ft being two to three times less than a given pulling force Fp placed on the strap 40. Often it is physically impossible to obtain a satisfactory tension force Ft.

To overcome this problem, the art has moved away from static cam buckles in favor of a ratchet type buckle that includes a ratchet mechanism to tighten the strap, resulting in a higher tension force on the strap. This is achieved through the mechanical advantage of the ratchet mechanism. However, these ratchet type buckles are much more complex than the static cam buckles and are more expensive to manufacture and sell. Further, such complex ratchet buckles can have a higher failure rate over time than that of the static cam buckles.

SUMMARY OF THE INVENTION

The present invention relates to a method and apparatus for reducing friction in a cam buckle for tightening a strap. The cam buckle includes a frame, a brake member, a roller member, a biasing element and a webbed strap. The brake member includes a serrated surface and is rotatably coupled to the frame and pivotal about a first axis. The roller member is rotatably coupled to the frame about a second axis, wherein the first axis and the second axis are substantially parallel to each other. The biasing element is operable to bias the serrated surface of the brake member toward the roller member. The webbed strap is formed from a polymeric material and is operable to be biased between the serrated surface and the roller member so that the brake member biases the webbed strap against the roller member. With this arrangement, when the webbed strap is placed in tension, such tension is maintained by preventing movement of the webbed strap in one direction and allowing movement in a second direction to increase the tension. The roller member is operable to rotate with movement of the webbed strap in the second direction to increase the tension in the webbed strap which facilitates a reduction in friction loss.

Other features and advantages of the present invention will become apparent to those of ordinary skill in the art through consideration of the ensuing description, the accompanying drawings, and the appended claims.

BRIEF DESCRIPTION OF THE DRAWINGS

While the specification concludes with claims particularly pointing out and distinctly claiming that which is regarded as the present invention, the advantages of this invention may be ascertained from the following description of the invention when read in conjunction with the accompanying drawings, in which:

DETAILED DESCRIPTION

Figure 1:
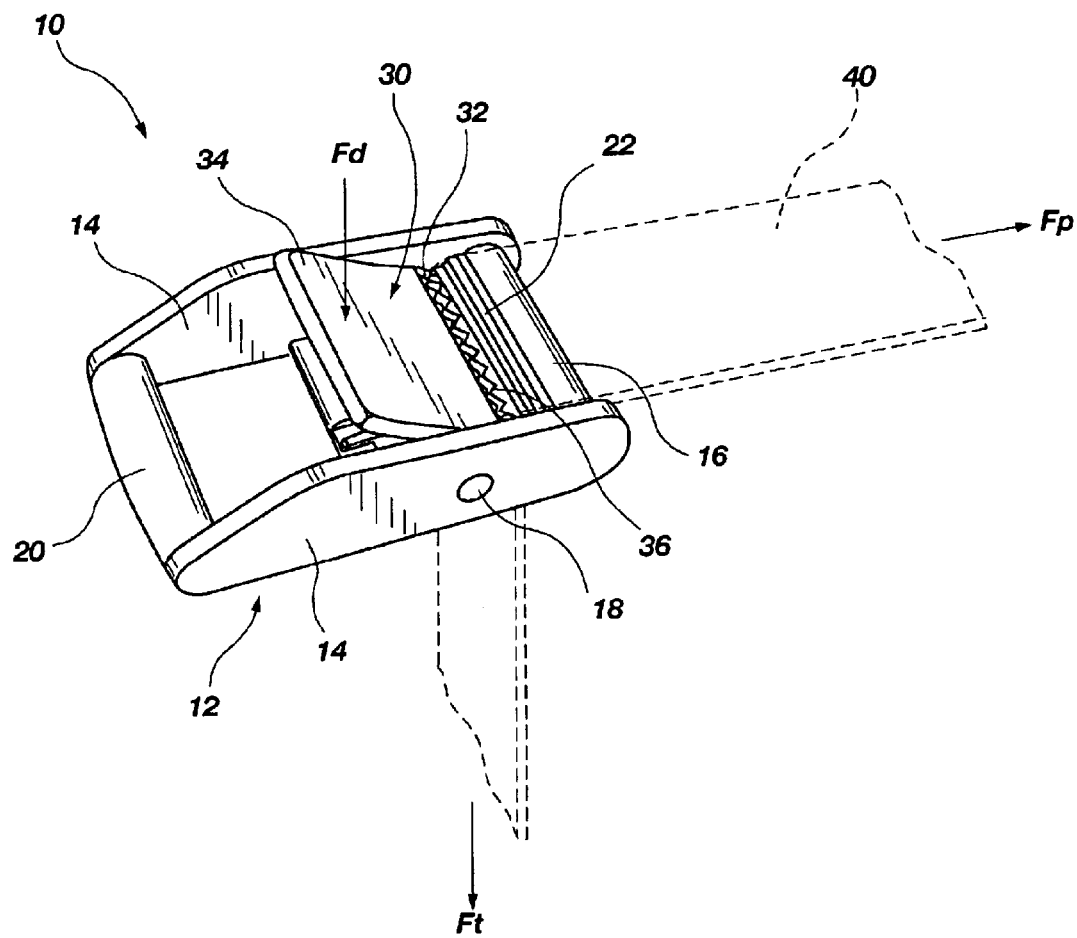
FIG. 1 illustrates a perspective view of a conventional static cam buckle, depicting a strap extending through the static cam buckle.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
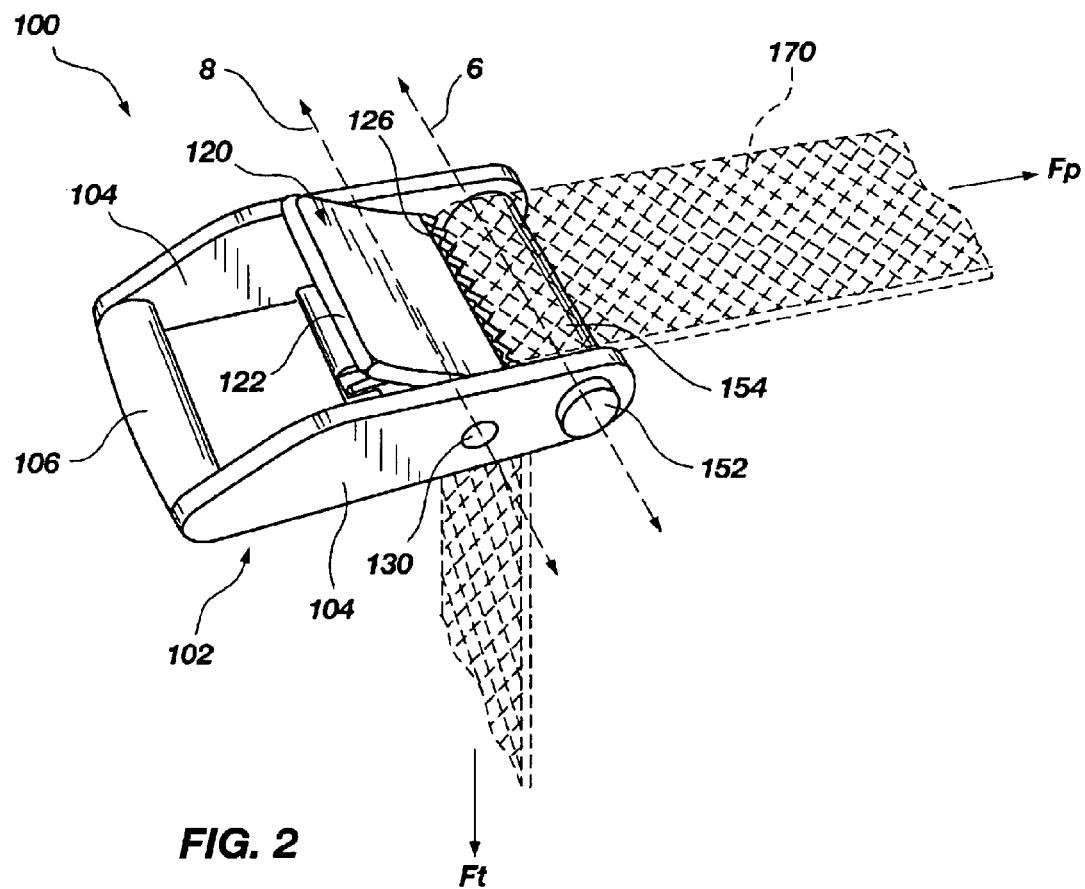
FIG. 2 illustrates a top perspective view of a roller cam buckle, depicting a brake member and a roller member, according to an embodiment of the present invention.
Figure 3:
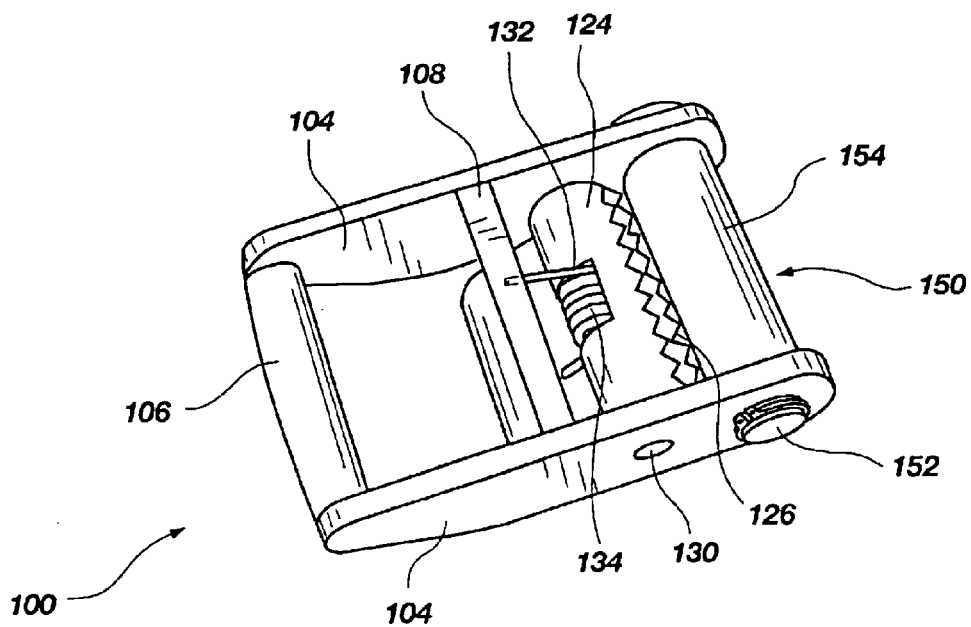
FIG. 3 illustrates a bottom perspective view of the roller cam buckle, depicting a biasing element configured to bias the brake member against the roller member.
Figure 4:
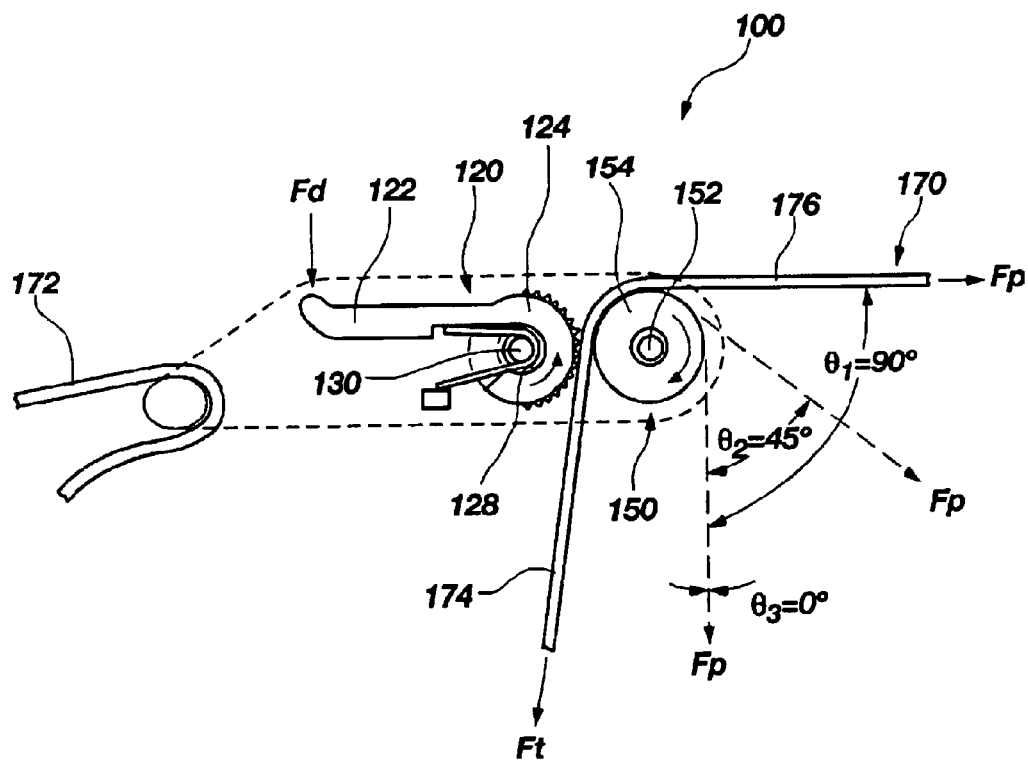
FIG. 4 illustrates a side view of the roller cam buckle, with the frame shown in outline, depicting the brake member biased against the roller member and a strap positioned therebetween.

FIGS. 2, 3 and 4 illustrate various views of a roller cam buckle 100 according to an embodiment of the present invention. Such a roller cam buckle 100 can be utilized for, and associated with, strapping objects, cargo, backpacks, bags or the like. Further, the roller cam buckle 100 can be configured with a single strap associated with the roller cam buckle and/or a double strap associated with the roller cam buckle.

The roller cam buckle includes a frame 102, a brake member 120 and a roller member 150. The brake member 120 and roller member 150 are rotatably coupled to the frame 102, wherein the brake member 120 is operable to pivotally bias a webbed strap 170 against the roller member 150. Such arrangement maintains tension in the webbed strap 170 so as to prevent movement of the webbed strap 170 in one direction and allows movement in a second direction to increase the tension. Significantly, the roller member 150 is operable to rotate with the movement of the webbed strap 170 in the second direction to facilitate a reduction of friction with such movement and, thereby, increase the tension in the webbed strap 170.

The frame 102 can include two side rails 104, which can extend substantially, longitudinally parallel with respect to each other. The frame also can include a back rail 106 and a cross member 108 each with opposing ends extending laterally with respect to the side rails 104 with the opposing ends fixedly joined to portions of the side rails 104. The frame 102 is typically made from a high strength metallic material such as steel, or an alloy thereof. The frame 102 can also be formed from a high strength polymeric material by, for example, injection molding.

The brake member 120 is typically a spring biased cam member, but can be any suitable type of braking mechanism. The brake member 120 can include an arm 122, a cam portion 124 and a biasing element 134. The cam portion 124 includes a bore 128 which extends laterally therethrough. The cam portion 124 is rotatably coupled to the frame 102 with a cam shaft 130. The cam shaft 130 is sized and configured to extend through the bore of the cam portion 124 so that the cam portion 124 is rotatably coupled to the frame 102 and pivotal about the cam shaft 130. The cam shaft 130 is typically fixed to the side rails 104, but can also be configured to rotate between the side rails 104 of the frame 102.

The cam portion 124 also defines a slot 132, which is sized and configured to house the biasing element 134. The biasing element 134 can be positioned in the slot 132 so that the biasing element 134 urges the brake member 120 against the roller member 150. The biasing element 132 can be a spring, multiple springs, or any other suitable biasing mechanism and/or clamping mechanism. The cam portion 124 also includes a serrated surface portion 126 configured to engage the webbed strap 170 and prevent the webbed strap 170 from loosening when the cam portion is biased against the roller member 150. Such serrated surface portion 126 can be any other surface suitable for engaging the webbed strap 170, such as a striated surface, grooved surface or the like.

Figure 4A:
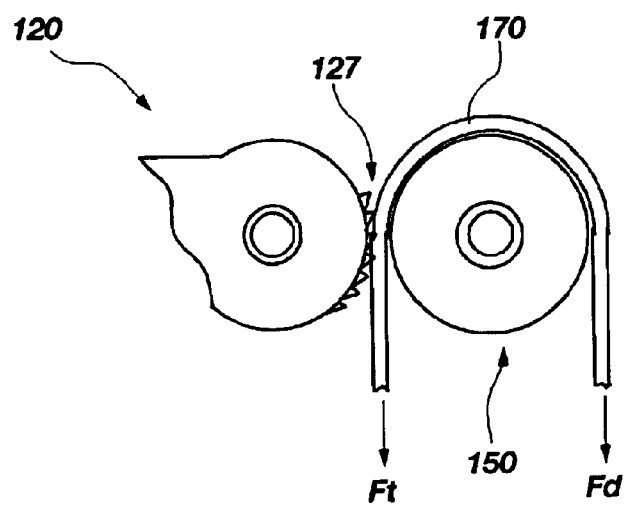
FIG. 4(a) illustrates a partial enlarged view of the brake member and roller member, depicting a serrated surface on the brake member having teeth formed in a particular orientation, according on an embodiment of the present invention.

With reference to FIG. 4(a), another embodiment of the serrated surface portion 127 is illustrated. In this embodiment, the serrations of the serrated surface portion 127 are slantedly oriented upward on the brake member 120. Such slanted orientation enables the webbed strap 170 to further reduce the friction and more readily be pulled over the roller member 150 in one direction with the pulling force Fp, but also prevents the webbed strap 170 from moving in the direction of the tension force Ft, thereby, maintaining the tension force as desired.

Referring back to FIGS. 2, 3 and 4, the roller member 150 can include a shaft 152 and a cylinder 154 having a bore 156 extending longitudinally therethrough. The roller member 150 can be assembled with the shaft 152 extending through the bore 156 with the opposing ends of the shaft fixedly or rotatably mounted between the side rails 104 of the frame 102. The shaft 152 of the roller member 150 and the cam shaft 130 for the brake member 120 are preferably substantially parallel with each other, with respective first and second axes 6 and 8, and spaced so that the cam portion 124 and the roller member 150 are positioned adjacent each other. The cylinder 154 can include a substantially planar surface along the longitudinal length of the cylinder 154. The cylinder 154 can include a smooth outer surface or any other suitable outer surface, such as a surface having striations, serrations, or grooves or an abrasive-type surface.

The webbed strap 170 can be a polymeric type material weaved in a web-like fashion. The polymeric type material can be any suitable type of high strength polymeric material, such as polypropylene, nylon, polyethylene and/or blends thereof. The webbed strap 170 can include a 5-to-1, or greater, width to thickness ratio. This ratio optimizes the holding strength of the cam portion biasing the roller member as well as reduces friction when applying the pulling force Fp. However, it should be noted that the width to thickness ratio can be less than 5-to-1 if required depending on the configuration of the roller cam buckle 100.

While functioning with the roller cam buckle 100, the webbed strap 170 includes two portions: the first portion 174 extending between a load and the cam buckle and having a tension force Ft; and, the second portion 176 extending between the roller cam buckle and being manually pulled by a user with a pulling force Fp. Also, a secondary strap 172 can be secured to the back rail 106 of the frame member. Such a secondary strap 172 can be an extension of the first portion 174, as a single strap associated with the roller cam buckle, or the secondary strap 172 can be separate from the first portion 174 to provide a double strap associated with the roller cam buckle.

To secure an object or load, for example, the secondary strap and the first portion of the webbed strap can be secured over or around the object or load. To increase the tension in the first portion of the webbed strap, a pulling force can be manually applied to the second portion of the webbed strap, thereby, tightening the webbed strap to the load. Once the pulling force is released, the cam portion is urged against the roller member to maintain the tension force Ft in the first portion of the webbed strap. To release the tension force Ft in the first portion of the webbed strap, a downward force Fd can be applied on the arm 122 of the brake member 120 in combination with a release of the pulling force Fp on the strap. Such downward force Fd pivots the cam portion 124 upward, which provides a gap between the cam portion 124 and the roller member 150 to release the webbed strap 170 from the tension force Ft.

According to an aspect of the present invention, the roller member 150 is configured to provide a friction reducing mechanism so that a maximum tension force can be achieved in the first portion 174 of the webbed strap 170 with a given pulling force Fp applied to the second portion 176 of the webbed strap 170. The friction reducing mechanism is employed by the roller member 150, wherein the frictional loss is rolling friction produced between the shaft 152 and the cylinder 154 of the roller member 150, and not the larger static frictional loss produced between the strap and the front rail as described in the prior art (FIG. 1). In this manner, the roller member 150 facilitates a friction reducing mechanism which provides a greater tension force Ft for a given pulling force Fp, than that facilitated by the conventional static cam buckle.

Since the roller member 150 rolls with the webbed strap 170 when the webbed strap is pulled with the pulling force Fp, the friction produced is not between the strap and front rail as in the prior art, but is transferred between the inside surface of the cylinder 154 and the surface of the shaft 152 of the roller member 150. Such frictional force can further be minimized by the choice of materials selected. For example, selected materials for the surfaces between the shaft 152 and cylinder 154 can include brass on steel, bronze impregnated with graphite on steel, Teflon, or any other suitable materials that have high durability and low friction when in sliding and/or rolling contact against each other. It is also contemplated that the cylinder 154 can be made of a high strength polymeric type material. Since all frictional losses will decrease the ultimate tension force Ft obtained in the webbed strap 170, any reduction in the frictional losses will result in a greater tension force Ft applied to the load for a given pulling force Fp.

To demonstrate the significant difference of frictional loss between the roller cam buckle and static cam buckle of the prior art, an experiment was conducted. In the experiment, the pulling force Fp was measured for three different pull angles, at 0, 45, and 90 degrees as indicated in FIG. 4, in order to achieve a 10 lb. tension force Ft. The chart below yields the experimental data.

| | Experimental Data | |
|---|---|---|
| Experiment | Static Cam Buckle Pulling Force, Fp (lbs) | Roller Cam Buckle Pulling Force, Fp (lbs) |
| 10 LB Tension Force $\theta = 0°$ | 37.8 | 19.5 |
| 10 LB Tension Force $\theta = 45°$ | 31.6 | 17.5 |
| 10 LB Tension Force $\theta = 90°$ | 25.0 | 18.6 |

The experimental data illustrates the roller cam buckle necessitates a much lower pulling force Fp to achieve a 10 lb. tension force Ft than that required by the conventional static cam buckle. This illustrates the significant advantage of allowing the webbed strap 170 to roll with the roller member 150 when being pulled with the pulling force Fp, rather than being dragged over the front rail of the conventional static cam buckle.

The experimental data further shows that the pulling force Fp required is relatively independent of the pull angle for the roller cam buckle, while the pulling force Fp for the static cam buckle changes dramatically depending on the pull angle. Other wise said, as the pull angle decreases, the amount of surface area in contact with the strap increases, resulting in higher frictional losses. In the case of the roller cam buckle, however, the frictional losses are relatively independent of the pull angle. This is a significant advantage as there are many instances where there can be great difficulty in cinching a strap when the user is working in a confined space. Such confined spaces make it virtually impossible to cinch a strap to a desired tension force Ft with the static cam buckle of the prior art, whereas the roller cam buckle can be cinched at most any angle configuration with approximately the same required pulling force Fp.

During the experiment, identical testing mechanisms and setup for each of the two buckles were maintained. A webbed strap with two looped ends were fed through each buckle. On the tension side, a static load of ten pounds was attached. The buckle was supported from a fixture with a metal hook. A digital load cell was attached to the other end of the webbed strap to measure the pulling force Fp. The pulling force Fp was increased until the weight was suspended from the ground to achieve the 10 lb tension force Ft.

The pulling force was recorded from the digital load cell. This experiment was repeated for each cam buckle at each of the angles, i.e., 0, 45 and 90 degrees, to determine the dependency of the pull angle versus the pulling force required to achieve a 10 lb. tension force Ft.

Based on the experimental data, it is apparent the use of a friction reducing mechanism, such as the roller member, greatly improves operating performance as compared to the static cam buckle of the prior art. In fact, the load tightening ability of the roller cam buckle is nearly twice the load tightening ability of the conventional static cam buckle, resulting, at some pull angles, in nearly a 100% increase in performance.

Figure 5:
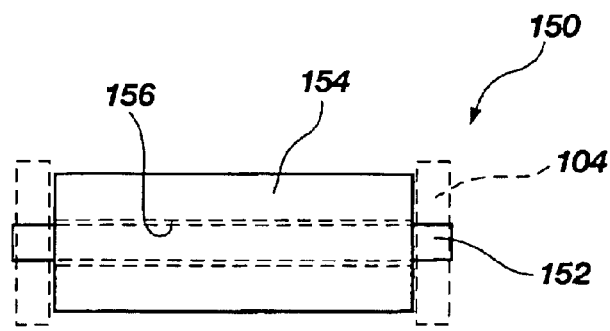
FIG. 5 illustrates a front view of the roller member, with the frame shown in outline, depicting a cylinder rotatable about a shaft, according to an embodiment of the present invention.
Figure 6:
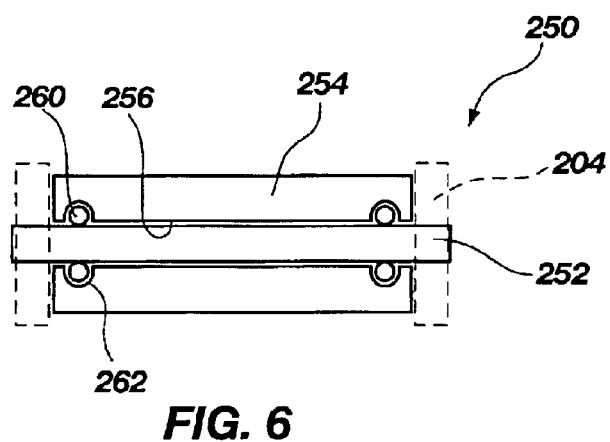
FIG. 6 illustrates a cross-sectional front view of a roller member, with the frame shown in outline, depicting a cylinder with ball-bearings rotatable about a shaft, according to another embodiment of the present invention.
Figure 7:
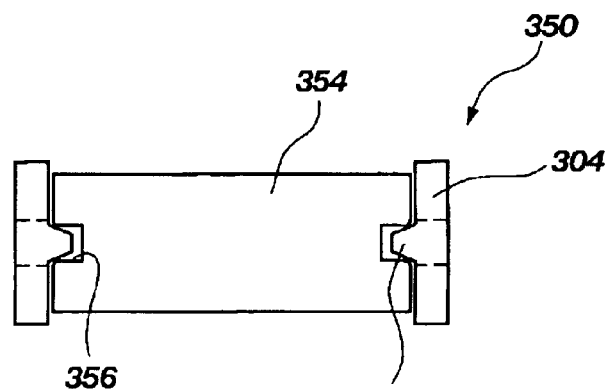
FIG. 7 illustrates a cross-sectional front view of a roller member, depicting a cylinder rotatable about nubs extending from opposing sides of the frame, according to another embodiment of the present invention.

Referring now to FIGS. 5–7, various embodiments for the roller member are illustrated. FIG. 5 illustrates a front view of the roller member 150 and the side rails shown in outline as previously described. As previously indicated, the shaft 152 is disposed in the bore 156 of the cylinder 154, wherein the tolerances of the diameter of the bore 156 and shaft 152 allow for the cylinder 154 to readily rotate about the shaft 152.

FIG. 6 illustrates a cross-sectional view of a roller member 250 of another embodiment. In this embodiment, the roller member 250 also includes a shaft 252, which can be fixedly or rotatably disposed in the side rails 204 (shown in outline). The roller member includes a cylinder 254 with a bore 256 extending longitudinally therethrough. However, in this embodiment, the cylinder does not make contact with the shaft 252, rather, there are bearings 260 inset in bearing recesses 262 defined in cylinder 254. The bearings 260 can be lubricated with a suitable bearing lubricant to minimize the frictional loss therein. Further, as in the roller member of the previous embodiment, the materials for each of the cylinder, shaft and bearing can be selected to optimally reduce friction therein as well as maintain integrity in the roller member 250 over time. As illustrated, the bearings 260 can be positioned adjacent opposing ends of the cylinder 254, but can also be provided at other positions in the cylinder 254, such as at a midpoint of the cylinder 254. Furthermore, due to the curvature of the bearings 260, the surface contact between the bearings 260 and the shaft 252 is minimized. As such, since the bearings are in rolling contact with the shaft with the minimized surface contact between the bearing 260 and shaft 252, the roller member 250 of this embodiment provides minimal friction loss when rolling and moving with the webbed strap with a pulling force, as previously set forth.

FIG. 7 illustrates a front view of another embodiment of the roller member 350. In this embodiment, there is no shaft, but rather, there are two nubs 352. The two nubs 352 can be inserted into apertures defined in the side rails 304. The roller member 350 also includes a cylinder 354. This cylinder includes recesses 356 centered and formed in opposing ends of the cylinder 354. The recesses 356 are sized and configured to correspond with the nubs 352 so that the cylinder is rotatably coupled to the nubs 352. In this embodiment, the surface contact is between a portion of the surface in the recesses 356 of the cylinder 354 and a portion of the surface on the nub 352. As such, the surface contact is minimized to thereby minimize the frictional loss in the rolling contact of the cylinder 354 with the nubs 352. It should be noted that various configurations in the nubs 352 and the recesses 356 defined in the cylinder 354 can be employed to obtain minimal surface contact and optimal performance in the roller member 350.

Figure 8:
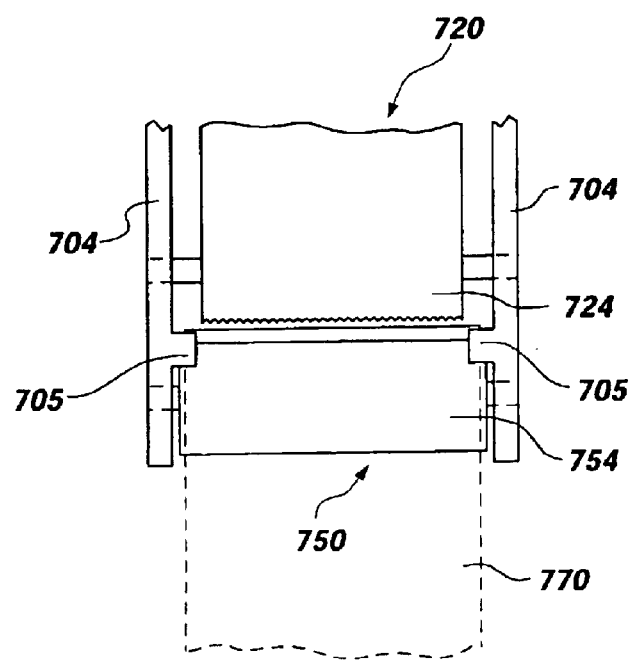
FIG. 8 illustrates a partial top view of the roller cam buckle, depicting guide tabs opposingly extending inward from the frame, according to an embodiment of the present invention.

Turning now to FIG. 8, another embodiment of the roller cam buckle is illustrated in a partial top view. This embodiment is substantially the same as that described in FIGS. 2, 3 and 4, except this embodiment includes tabs 705 or flanges. The tabs 705 can be formed to extend inward toward each other from the side rails 704. Also, the tabs 705 can be positioned along the side rails 704 so as to prevent the webbed strap 770 from moving in a space between the cam portion 724 of the brake member 720 and the side rails 704. Otherwise said, the tabs 705 substantially guide and maintain the webbed strap to be centered over the roller member 750. Such tabs 705 can be advantageous in cases where the webbed strap is being pulled with an off-set pulling. As illustrated, such positioning of the tabs 705 can be to at least partially extend over the cylinder 754 of the roller member 750.

Figure 9:
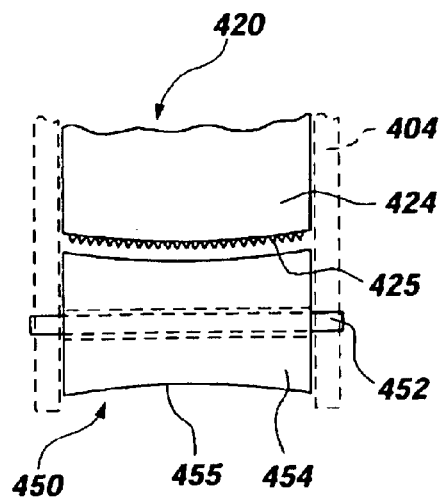
FIG. 9 illustrates a partial top view of the roller cam buckle, depicting the roller member and brake portion having corresponding respective concave and convex surfaces, according to an embodiment of the present invention.
Figure 10:
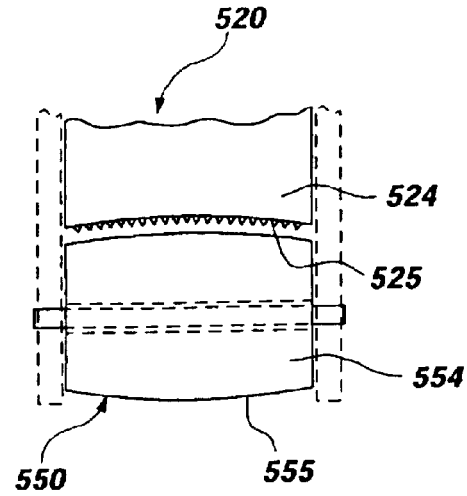
FIG. 10 illustrates a partial top view of the roller cam buckle, depicting the roller member and brake portion having corresponding respective convex and concave surfaces, according to another embodiment of the present invention.

Referring now to FIGS. 9 and 10, partial top views of a roller cam buckle are illustrated according to other embodiments of the present invention. FIG. 9 illustrates an embodiment of a roller member 450 with a cylinder 454 rotatably coupled to a shaft 452, or any other suitable rotatable coupling means, such as the nubs described with respect to FIG. 7. In this embodiment, the cylinder 454 includes a concave surface 455. Also, a portion of the periphery of the cam portion 424 facing the cylinder 454 can include a convex surface 425, which is sized and configured to correspond with the concave surface 455 of the roller member 450. Such configuration of the concave surface 455 and convex surface 425 provides advantages of maintaining the webbed strap to the center of the cylinder 454 as the webbed strap is being pulled, for example, an off-set pulling force. Providing such configuration can assist in preventing the webbed strap from partially moving between the cam portion 424 and the side rails 404 (shown in outline).

FIG. 10 illustrates another embodiment configured to substantially prevent the webbed strap from partially moving between the cam portion 524 and the side rails 504 shown in outline. This embodiment is substantially the same as that described in FIG. 9, except the cylinder 554 includes a convex surface 555 and a portion of the periphery of the cam portion facing the cylinder 554 is a concave surface 525.

Figure 11:
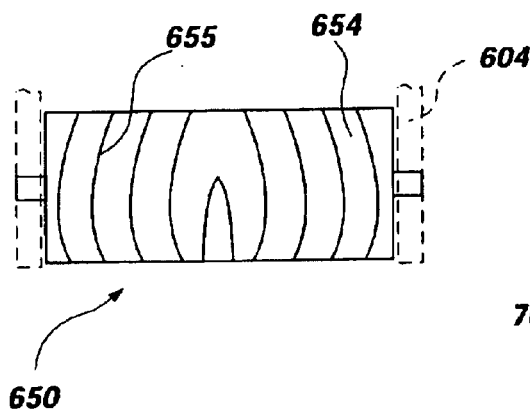
FIG. 11 illustrates a front view of the roller member, depicting the cylinder of the roller member having grooves formed in the surface thereof, according to an embodiment of the present invention.

With respect to FIG. 11, another embodiment of a roller member 650 is illustrated. In this embodiment, the roller member 650 includes grooves 655 or cuts formed in a surface of the cylinder 654. Such grooves 655 can be formed collectively in a pattern configuration so that as the webbed strap moves with the surface of the rotatable cylinder 654, the grooves 655 in the pattern configuration substantially maintain the webbed strap in the center of the cylinder 654. Such a pattern configuration serves as a preventative measure to maintain the webbed strap centered over the cylinder 654, and not to move partially between the cam portion (not shown) and the side rails 604 (shown in outline). It should be noted that there can be many variations of the pattern configuration.

Figure 12:
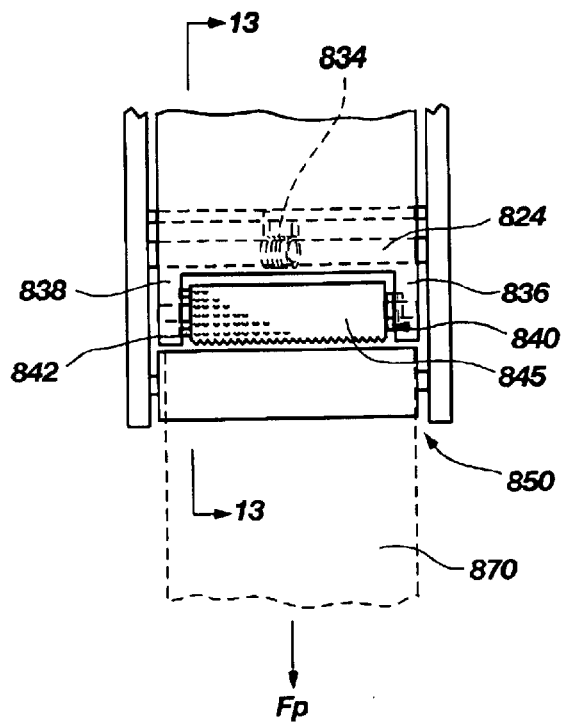
FIG. 12 illustrates a top view of a roller cam buckle, depicting the brake member having a second roller biased against the roller member with a webbed strap therebetween, according to another embodiment of the present invention.
Figure 13:
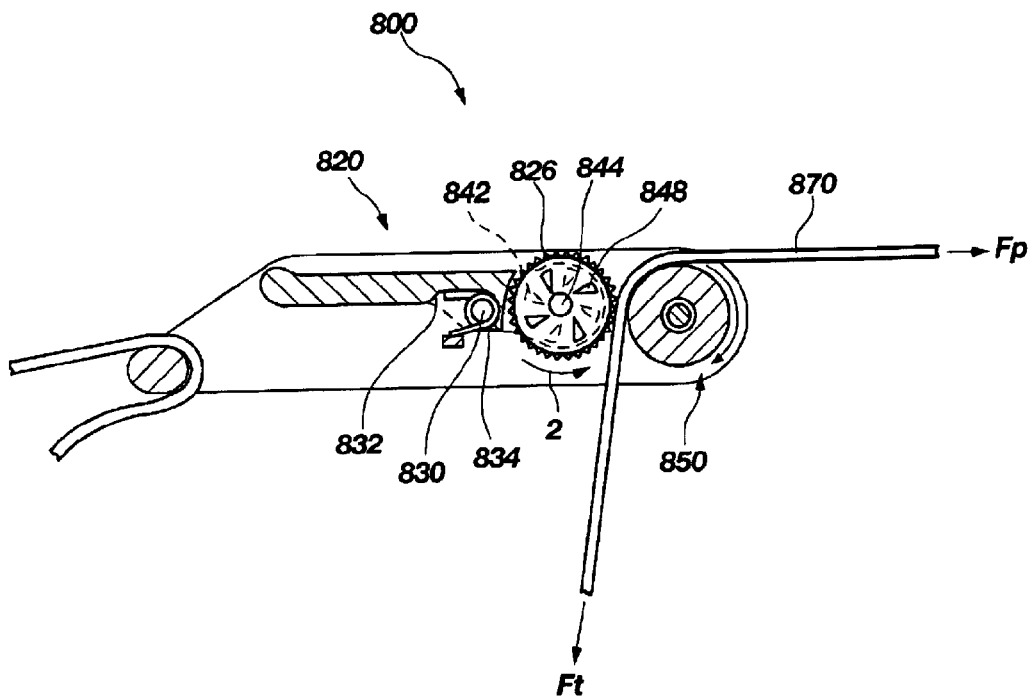
FIG. 13 illustrates a cross-sectional view of the roller cam buckle taken along line 13 in FIG. 12, depicting teeth in the second roller and a sprag member formed in an extension arm shown in outline.

FIGS. 12 and 13 illustrate another embodiment of a roller cam buckle 800 according to the present invention. In this embodiment, the roller cam buckle 800 includes a second roller 845 in the cam portion 824 of the brake member 820. As in the previous embodiments, the cam portion 824 is rotatably coupled to a cam shaft 830 and includes a biasing element 834 in a cam slot 832 configured to operably bias the cam portion 824 against the roller member 850. The cam portion 824 includes a first extension arm 836 and a second extension arm 838 each extending toward the roller member 850. A roller shaft 844 is coupled between the extension arms. The second roller 845 is rotatably coupled to the roller shaft 844. The first extension arm 836 can include a spring 840 coupled thereto and configured to bias the second roller 845 toward the second extension arm 838. The second extension arm 838 can include a sprag member 842.

The second roller 845 can be cylindrical in shape and includes a serrated surface 826. The second roller 845 can include teeth 848 facing the sprag member 842 which are configured to match with the configuration of the sprag member 842. With the spring 840 biasing the second roller 845 toward the sprag member 842, the sprag member 842 and the teeth 848 on the second roller 845 are configured to allow unidirectional rotation of the second roller 845 in the rotating direction of arrow 2. In this manner, the sprag member 842 yields to the teeth 848 in the rotating direction of arrow 2. In the opposite rotating direction, the sprag member 842 and teeth 848 match-up and lock the second roller 845, to thereby, prevent such opposite rotating direction. As such, when a user applies a pulling force Fp on the webbed strap 870, both the second roller 845 and the roller member 850 roll with the movement of the webbed strap 870 to further reduce friction so that a maximum tension force Ft can be obtained for a given pulling force Fp. It should be noted that the second roller 845 having the unidirectional rotation via the sprag member 842 and teeth 848 is not limited to the description herein and can be configured with any other suitable technique and implemented by one of ordinary skill in the art.

While the present invention has been disclosed in terms of exemplary embodiments and variations thereof, those of ordinary skill in the art will recognize and appreciate that the invention is not so limited. Those of ordinary skill in the art will recognize and appreciate that many additions, deletions and modifications to the disclosed embodiments and its variations may be implemented without departing from the scope of the invention, which is limited only by the appended claims and their legal equivalents.

What is claimed is:

1. A cam buckle configured to reduce friction for tightening a strap, the cam buckle comprising:
   a frame;
   a brake member at having a contoured friction surface, said brake member being rotatably coupled to said frame and pivotal about a first axis, and including a brake roller having unidirectional rotation;
   a roller member rotatably coupled to said frame about a second axis, said second axis being substantially parallel said first axis;
   a biasing element operable to bias said brake member toward said roller member and against the strap; and
   a webbed strap operable to be biased between said contoured friction surface and said roller member so that said brake member urges said webbed strap against said roller member when placed in tension so as to maintain said tension by preventing movement of said webbed strap in one direction and allowing movement in a second direction to increase said tension;
   wherein said roller member and said brake roller are operable to rotate with movement of said webbed strap in said second direction to increase said tension in said webbed strap.

2. The cam buckle of claim 1, wherein said roller member comprises a shaft coupled to said frame and a cylinder rotatable around said shaft.

3. The cam buckle of claim 2, wherein said roller member includes bearings disposed in said cylinder and operable to rotate with said cylinder around said shaft.

4. The cam buckle of claim 1, wherein said roller member comprises a cylinder with recesses defined in opposing ends of said cylinder, said cylinder rotatable around nubs extending from and disposed in said frame.

5. The cam buckle of claim 1, wherein said tension in said strap is substantially limited only by rolling contact friction in said roller member with respect to a pulling force applied to said webbed strap in said second direction.

6. The cam buckle of claim 1, wherein the roller member comprises a substantially smooth surface configured to be at least partially in contact with the webbed strap.

7. The cam buckle of claim 1, wherein said roller member comprises an abrasive surface configured to be at least partially in contact with the webbed strap.

8. The cam buckle of claim 1, wherein said contoured friction surface of said brake member comprises serrations slantedly oriented so that said webbed strap passes over said serrations in said second direction and is prevented from passing over said serrations in said first direction.

9. The cam buckle of claim 1, wherein said roller member comprises an axially concave surface configured to be in contact with the webbed strap.

10. The cam buckle of claim 1, wherein said roller member comprises an axially convex surface configured to be in contact with the webbed strap.

11. The cam buckle of claim 1, wherein said roller member comprises a grooved surface configured to be at least partially in contact with the webbed strap.

12. The cam buckle of claim 11, wherein said grooved surface collectively comprises a pattern configuration operable to substantially maintain a centered position of said webbed strap during movement of said webbed strap in said second direction.

13. The cam buckle of claim 1, wherein said frame includes tabs extending inward at opposing positions from said frame to substantially maintain a centered position of said webbed strap during movement of said webbed strap in said second direction.

14. The cam buckle of claim 1, wherein said webbed strap comprises a woven high-strength polymeric material.

15. The cam buckle of claim 1, wherein said webbed strap comprises at least one of a polypropylene material and a polyethylene material.

16. The cam buckle of claim 1, wherein said brake member includes a sprag member operable with said brake roller to provide said unidirectional rotation so as to prevent movement of said webbed strap in said one direction and to maintain said tension in said webbed strap.

17. A cam buckle configured to reduce friction for tightening a webbed strap, the cam buckle comprising:
   a frame;
   a roller member rotatably coupled to said frame;
   a brake member movably coupled to said frame, including a second roller having unidirectional rotation; and
   a biasing element operable to bias said brake member toward said roller member with the webbed strap therebetween;
   wherein said roller member acts in conjunction with said brake member to capture the webbed strap between said brake member and said roller member when the webbed strap is placed in tension by preventing movement of the webbed strap in one direction and allowing movement in a second direction; and
   wherein said roller member and said second roller are operable to rotate with movement of the webbed strap in said second direction to increase said tension in the webbed strap.

18. The cam buckle of claim 17, wherein said brake member includes a sprag member operable with said second roller to provide said unidirectional rotation so as to prevent movement of said webbed strap in said one direction and to maintain said tension in the webbed strap.

19. A cam buckle for tightening a strap, comprising:

a frame;

a first roller, rotatably coupled to the frame;

an elongate strap, disposed against the first roller;

a cam, pivotally coupled to the frame and disposed against the strap opposite the first roller, the cam including a second roller having unidirectional rotation, configured to secure the strap between the second roller and the first roller to resist movement of the strap in a first direction, and to allow movement of the strap in a second direction, the first and second rollers being configured to rotate with movement of the strap in the second direction; and a biasing element, configured to bias the cam toward the first roller and the strap.

20. The cam buckle of claim 19, further comprising a sprag, configured to resist rotation of the second roller corresponding to movement of the strap in the one direction.

21. A cam buckle for tightening a strap, comprising:

a frame;

a roller, rotatably coupled to the frame, having an axially-curved surface;

an elongate strap, disposed against the first roller;

a cam, rotatably coupled to the frame and disposed against the strap opposite the roller, having an axially-curved, contoured friction surface substantially congruent to the axially curved surface of the roller, the cam being configured to secure the strap between the cam and the roller to resist movement of the strap in a first direction, and to allow movement of the strap in a second direction; and a biasing element, configured to bias the cam toward the roller and the strap;

the roller being configured to rotate with movement of the strap in the second direction.

22. The cam buckle of claim 21, wherein the laterally-curved surface of the roller is convex, and the laterally-curved surface of the cam is concave.

23. The cam buckle of claim 21, wherein the laterally-curved surface of the roller is concave, and the laterally-curved surface of the cam is convex.

* * * * *